(12) United States Patent
Raghavan et al.

(10) Patent No.: US 10,394,794 B2
(45) Date of Patent: Aug. 27, 2019

(54) SYSTEMS AND METHODS FOR MULTI-FILE CHECK-IN

(71) Applicant: Open Text SA ULC, Halifax (CA)

(72) Inventors: Srikanth Raghavan, Ashburn, VA (US); Richard Guildford Hellier, Jr., Catawba, VA (US); Kathy DiBella, Milford, NH (US); Michael Scott, Washington Grove, MD (US); Andrew Chillrud, Saratoga Springs, NY (US)

(73) Assignee: Open Text SA ULC, Halifax (CA)

( * ) Notice: Subject to any disclaimer, the term of this patent is extended or adjusted under 35 U.S.C. 154(b) by 308 days.

(21) Appl. No.: 15/365,280

(22) Filed: Nov. 30, 2016

(65) Prior Publication Data

US 2017/0154065 A1    Jun. 1, 2017

Related U.S. Application Data

(60) Provisional application No. 62/261,162, filed on Nov. 30, 2015.

(51) Int. Cl.
*G06F 16/18* (2019.01)
*G06F 16/21* (2019.01)
*G06F 16/22* (2019.01)
*G06F 16/23* (2019.01)
*G06F 16/25* (2019.01)
*G06F 16/33* (2019.01)
(Continued)

(52) U.S. Cl.
CPC ........ *G06F 16/2343* (2019.01); *G06F 3/0482* (2013.01); *G06F 3/0486* (2013.01); *G06F 3/04847* (2013.01); *G06F 16/1873* (2019.01);

*G06F 16/211* (2019.01); *G06F 16/219* (2019.01); *G06F 16/22* (2019.01); *G06F 16/2329* (2019.01); *G06F 16/25* (2019.01); *G06F 16/3337* (2019.01); *G06F 17/245* (2013.01); *G06F 17/289* (2013.01); *H04L 63/08* (2013.01)

(58) Field of Classification Search
CPC .......... G06F 17/30362; G06F 17/3023; G06F 17/245; G06F 17/30292; G06F 3/04847; G06F 17/30312; G06F 3/0482; G06F 17/30669; G06F 17/289; G06F 17/30557; G06F 17/30309; G06F 17/30356; G06F 3/0486; G06F 16/2343; G06F 16/1873; G06F 16/3337; G06F 16/2329; G06F 16/219; G06F 16/211; G06F 16/25; G06F 16/22; H04L 63/08; H04L 67/42
See application file for complete search history.

(56) References Cited

U.S. PATENT DOCUMENTS 6,947,959 B1 *  9/2005  Gill ................... G06F 17/30011
                                           707/999.003
2005/0038724 A1 *  2/2005  Roever .................. G06Q 20/12
                                           705/35
(Continued)

*Primary Examiner* — Jorge A Casanova
(74) *Attorney, Agent, or Firm* — Sprinkle IP Law Group

(57) ABSTRACT

A content management system provides a mechanism for multi-file check-in features useful for content management. The content management system provides a way for users to check in multiple files in a single action. The system allows users to either select assets (e.g., files) or drag and drop multiple assets to be checked in. The assets being checked in are automatically matched with checked out assets, and once matched, unlocked.

20 Claims, 4 Drawing Sheets

(51) Int. Cl.
*G06F 17/24* (2006.01)
*G06F 17/28* (2006.01)
*G06F 3/0482* (2013.01)
*G06F 3/0484* (2013.01)
*G06F 3/0486* (2013.01)
*H04L 29/06* (2006.01)

(56) References Cited

U.S. PATENT DOCUMENTS

2007/0266032 A1* 11/2007 Blumenau ......... G06F 17/30085
2016/0132525 A1* 5/2016 Avery ............... G06F 17/30106
                                                                                                      707/769

* cited by examiner

SYSTEMS AND METHODS FOR MULTI-FILE CHECK-IN

CROSS-REFERENCE TO RELATED APPLICATION(S)

This application is a conversion of, and claims a benefit of priority under 35 U.S.C. § 119 from U.S. Provisional Application No. 62/261,162, filed Nov. 30, 2015, entitled "SYSTEMS AND METHODS FOR MULTILINGUAL METADATA, MULTI-FILE CHECK-IN, AND MULTI-BRAND EXPERIENCE," which is hereby fully incorporated by reference herein.

TECHNICAL FIELD

This disclosure relates generally to content management, including digital asset management, multimedia management, etc. More particularly, embodiments disclosed herein relate to systems, methods, and computer program products for multi-file check-in features useful for content management.

BACKGROUND

Traditional content management systems allow users to check out assets (e.g., files, etc.), and at a later time, check them back in. For example, a user may check out the latest version of assets to edit them. When the user checks out an asset, the media management locks that asset to prevent other users from overwriting the asset's contents. Other users may still view the asset or update the metadata, however, they cannot check out or modify the content of the asset. Once an asset is checked back in, Media Management keeps the previous version of the asset as well as the new modified version. While traditional content management systems allow users to check-out multiple files, files have to be checked-in one-at-a-time.

SUMMARY

An object of this disclosure is to provide a new feature function for multi-file check-in, which can be particularly useful for multimedia management (MM). For example, suppose a photographer uploads hundreds of digital assets as a zip file to a MM system (MMS) and the MMS stores the uploaded digital assets (files) in a folder managed by the MMS. A designer may edit or otherwise modify (e.g., retouch) these files in a bulk operation. Once the work is done, the files can be dropped back into the folder. Previously, however, this is a tedious manual process as the files must be checked in to the MMS individually. The multi-file check-in feature function disclosed herein can initiate check-ins for all of the edited assets when a file is dropped back into the folder, eliminating the need to individually check each file in.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
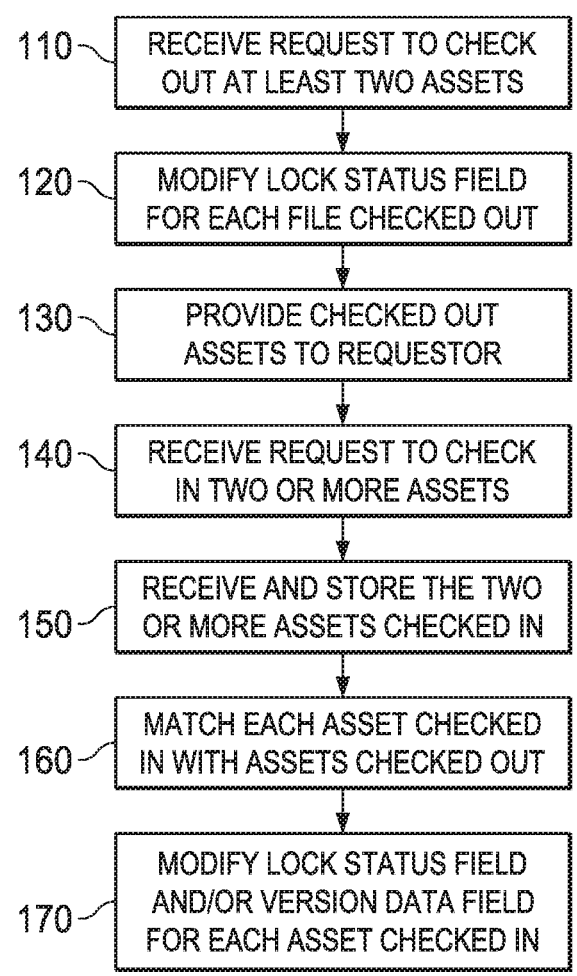
FIG. 1 depicts a flow chart illustrating an example of a method for providing multi-file check-in in a content management system.

Generally, embodiments of the present disclosure relate to systems, methods, and computer program products for new multi-file check-in features useful for content management. The disclosure describes a way for users to check in multiple files in a single action, increasing productivity significantly. FIG. 1 (described below) is a flow chart illustrating an example of a method for providing multi-file check-in in a content management system. In some embodiments, the method may comprise receiving a request to check out at least two assets; modifying a lock status field for each of the at least two assets; providing the at least two assets to a user on a client device; receiving a request to check in two or more assets; receiving the two or more assets; storing the two or more assets received; and modifying the lock status field for each of the two or more assets received.

Figure 2:
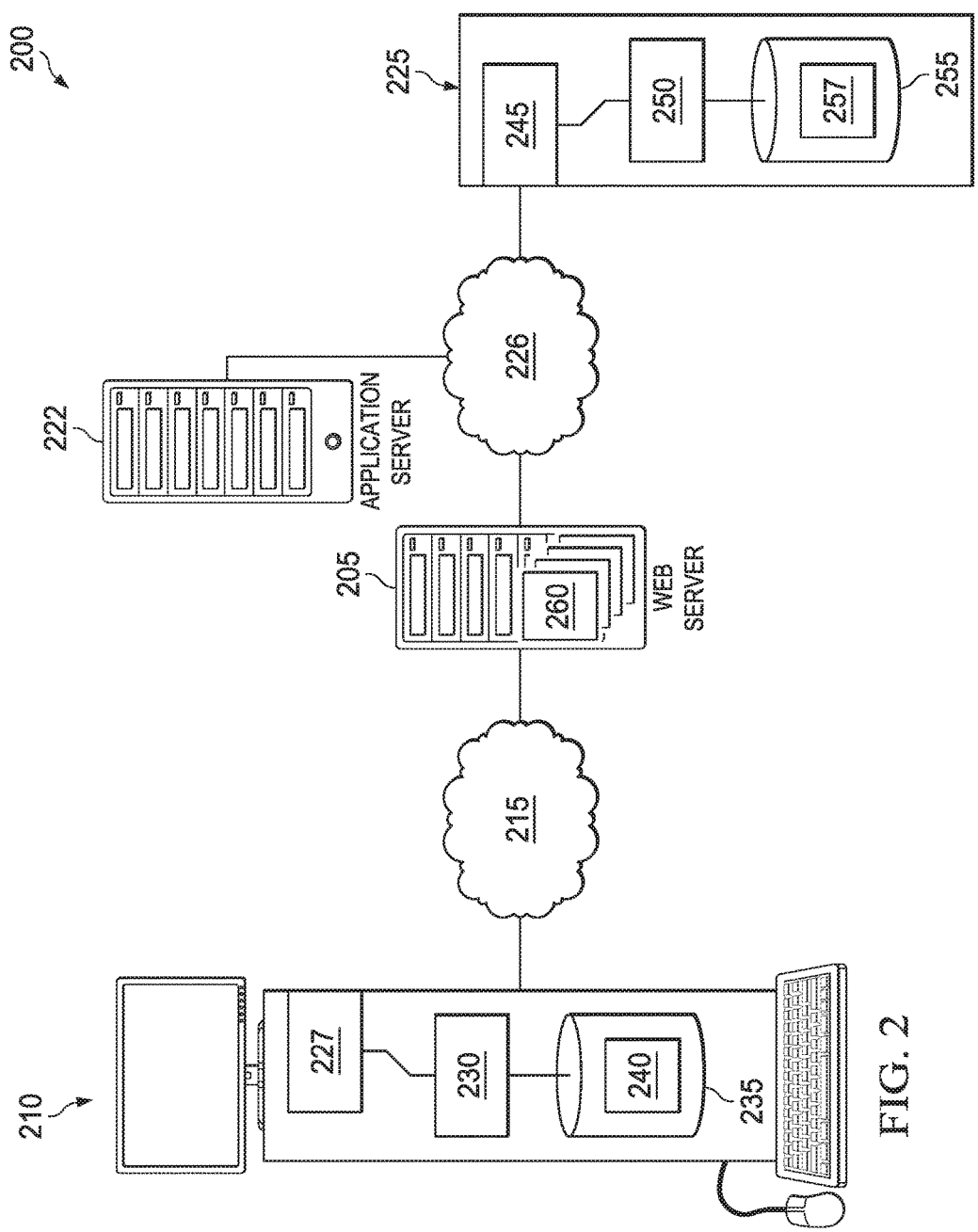
FIG. 2 depicts an exemplary enterprise computing environment where embodiments disclosed herein may be implemented.

FIG. 2 depicts a diagrammatic representation of enterprise computing environment 200 where embodiments disclosed herein may be implemented. In FIG. 2, web server 205 is communicatively connected to client computer 210 via network 215, which can be a global computer network such as the Internet, a local area network (LAN), a wide area network (WAN), a wireless network or any computer network known in the art. Web server 205 can also be communicatively connected to additional servers, such as, for example, application server 222 and content management system (CMS) 225 via, for example, second network 226 (e.g., a LAN).

Client computer 210 can include network interface 227 (e.g., an internal or external modem, Ethernet adapter or other network interface device known in the art) to connect to and interface with network 215, processor 230 and non-transitory computer readable storage medium 235 (e.g., random access memory (RAM), read-only memory (ROM), optical storage medium, magnetic storage medium or any other computer readable memory known in the art). Additionally, client computer 210 can include one or more input devices (e.g., keyboard, mouse, voice activated input or other input device known in the art) and one or more displays. Computer readable storage medium 235 can store browser program 240 that can be executable by processor 230 to allow a user, through the use of the input and display devices, to request and view web pages over network 215. Examples of browser programs include Netscape Navigator™, (Netscape and Netscape Navigator are trademarks of Netscape Communications Corporation of Mountain View, Calif.) and Microsoft Internet Explorer™ (Microsoft and Microsoft Internet Explorer are trademarks of Redmond Wash. based Microsoft Corporation).

Likewise, CMS 225 can include a network interface 245 (e.g., an internal or external modem, Ethernet adapter or other network interface device known in the art) to connect to and interface with network 226, processor 250 and non-transitory computer readable storage medium 255 (e.g., RAM, ROM, optical storage medium, magnetic storage medium or any other computer readable memory known in the art). Computer readable storage medium 255 can store computer instructions 257 executable by processor 250 to perform one or more feature functions disclosed herein.

Although not shown for clarity, each of web server 205 and application server 222 can include computer components such as network interfaces, memories, processors, and other computer components and software known in the art. Web server 205 can host web site 260 that can comprise one or more web pages. A user, via browser program 240, can generate a request, such as an HTTP GET request for a web page hosted by web server 205. Web server 205 can retrieve the web page and communicate the web page to browser 240 for review by a user. Included in the web page can be text, graphics, audio content and video content. Additionally, each of web server 205 and application server 222 can contain software applications that can communicate with CMS 225 at the backend.

An enterprise may use CMS 225 to store, organize, find, retrieve, and share managed objects. Managed objects may include, for example, media files or digital media. Each managed object may have metadata associated therewith that describe the particular managed object. Metadata may include various fields, such as author's name, description of the file, etc. and may be useful in cataloging and searching managed objects. A search application may use the information contained in the metadata of a managed object when searching for managed objects.

Skilled artisans appreciate that CMS 225 is representative of many types of information management systems, including those that provide digital media management. Digital media refers to any media that are encoded in a machine-readable format. Objects managed by CMS 225 can include many types of digital media, for instance, computer programs, text, images, audio, videos, games, web pages, web sites, databases, etc. Digital media can be created, viewed, distributed, modified, and preserved on computers and often have rich metadata associated therewith. For example, an image of a company's product may have metadata such as a product description, a photographer, etc. associated with the image. These descriptions may be comprised of strings of text. A user wishing to search for digital media may initiate a search. A search application may utilize the text strings in the metadata and return search results to the user.

As described above, FIG. 1 is a flow chart illustrating an example of a method for providing multi-file check-in in a content management system. In some embodiments, the method begins with step 110, where a request to check out at least two assets is received. In response, at step 120, a lock status field for each of the at least two assets is modified. Next, at step 130, at least two assets are provided to a user (e.g., a requestor) on a client device, such as client device, such as client computer 210, shown in FIG. 2. At step 140, a request to check in two or more assets is received. At step 150, the two or more assets are received and stored. In response, at step 160, the system matches each asset checked in with assets that are currently checked out. Finally, at step 170, the lock status field for each of the two or more assets received is modified.

In some embodiments, the method may further comprise updating a version data field for each of the one or more files checked in. In some embodiments, the method may further comprise matching each asset of the two or more assets received with the at least two assets provided.

While a multiple file check-in system described here may be used in many types of content management systems, typical content management systems use similar rules or guidelines. For example, typically partially deleted assets cannot be checked out. A "partially deleted" asset is an asset whose master file and one or more content kinds have been deleted, leaving the metadata of the asset intact in the system. In another example, metadata-only assets cannot be checked out.

In some embodiments, a user may wish to edit an asset (an object) managed by a content management system. In editing an asset managed by a content management system, a user may check out the asset from the content management system, edit the asset, and then check the asset back in to the content management system. When a user checks out an asset, the system locks out the asset until the asset is checked back in by the user. Locking out an asset may be done by modifying a lock status field associated with the asset. Current content management systems allow for a user to check out multiple assets at once. When multiple assets are checked out, all of the assets checked out are locked out and each asset remains locked out until the asset is checked in again. However, under current systems, a user checking out multiple assets has to check the assets back in one at a time. Checking in assets one at a time may be cumbersome, tedious, and time consuming.

To this end, some embodiments of a content management system, such as a multimedia manager, may allow a user to check in multiple assets at the same time.

In some embodiments, multi-file check-in is possible even if the files contain file extensions that are different from the files that were checked out. Multi-file check-in for files with different extensions can be extremely useful, for example, because a user may wish to check out multiple files and edit all of the files and then check the files back in with a slightly different file name than the file that was checked out. For example, a user may wish to check out a photograph with a .raw file extension and edit it using image editing software such as Adobe Photoshop. The user may wish to save the file in an Adobe Photoshop format to preserve future editing capabilities, resulting in a file with a file extension such as .psd.

In some embodiments, a user may check in multiple files with filenames similar to the file names of the files checked out. The system may operate to match the checked in files with the files that were checked out. The files are checked in as a newer version of the previous file.

In some embodiments, assets are checked-out using the following procedure. Of course, other procedures may be used, as one skilled in the art would understand. When checking out one or more assets, a user may display a folder or perform a search to display the assets that the user wants to check out. In one example, a user can hover the mouse over the asset so an asset menu appears, and then click the "additional actions" icon, and then click a "checkout" button or the like. To check out multiple assets, a user may select the assets that the user wishes to check out and then clicks the "checkout" button or the like. In some embodiments, assets that are checked out may display a "checked-out" icon or any suitable graphical representation on a user interface running on a user device.

In some embodiments, a user may select multiple files for check out or may be given a job folder containing multiple files that need to be modified. The user may select the multi-file check out option and the selected files are downloaded automatically. Multiple files may also be checked out using more than one check out operation, such as by performing a check out operation any number of times on any combination of single and multiple files. The system may receive the check-out request and provide the checked out files to the user. The files may be provided individually or as an archive file such as a zip file. The system may lock out all of the checked out files. Each such file will remain locked out until the file is checked back in. Locking out the files may be done by modifying a lock status field for the files checked out. Through a user interface, for instance, the system may indicate to a user that the file has been checked out by another user. Other users may view the checked out asset or update the asset's metadata but they may not check out or modify the asset.

The user who checked out the files may edit the checked out files individually or in a batch process. When the user has finished modifying the files, the user may check the files back in. The user may check in some or all of the files checked out. Check-in may be done by requesting the check-in option provided by the system via the user interface of the system. Check-in may also be requested, for example, by a user dragging and dropping files into a certain folder.

Responsive to receiving the check-in request and the files, the system may operate to match the dropped file with the checked out files. Matching is possible regardless of the order in which the files are checked out or in. In some embodiments, if a match is found, the system may automatically map the file and performs a check in operation. In some embodiments, the system may match the files and wait for a user to initiate check-in. In some embodiments, if the system is unable to match a file, that file is ignored. In some embodiments, the system may store the checked in files and may modify the lock status field to indicate that the file is no longer locked. Matched files may be automatically checked in as a new version. The system may update a version data field to identify the current version of the file.

In some embodiments, the system may operate to check in multiple files even if the file names have changed. For example, a file may be saved with a different extension after editing. The system may match the files by, for example, ignoring the file extension.

Figure 4:
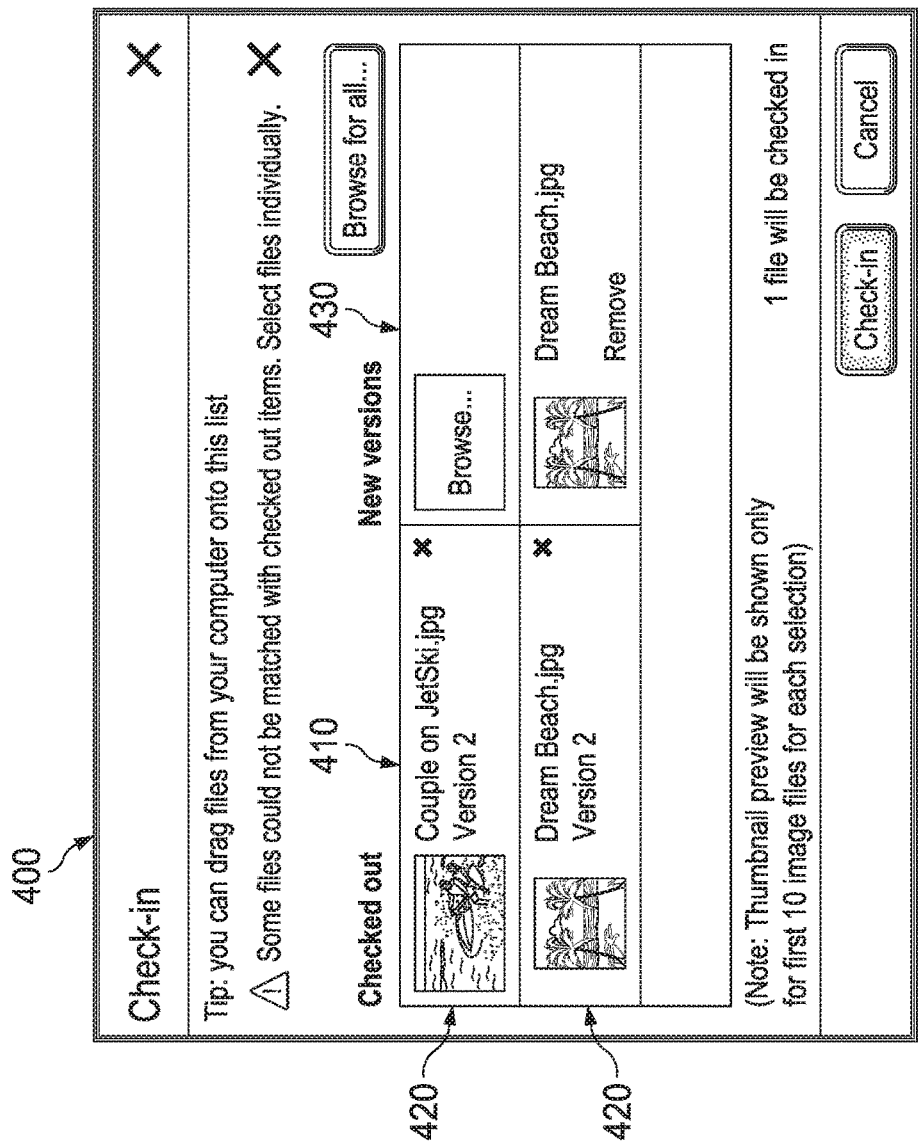
FIG. 4 depicts a screenshot representation of a check-in procedure dialog box running on a user device during a check-in procedure.

Note that, for some types of assets, the system also allows users to view thumbnails of assets. For example, as shown in FIG. 4 (described below), the "Check-in" screen or page shows a thumbnail of checked out asset "Dream Beach.jpg," as well as new version "Dream Beach.jpg." By showing both thumbnail previews, the user is able to view both assets to verify whether they are correctly matched.

Figure 3:
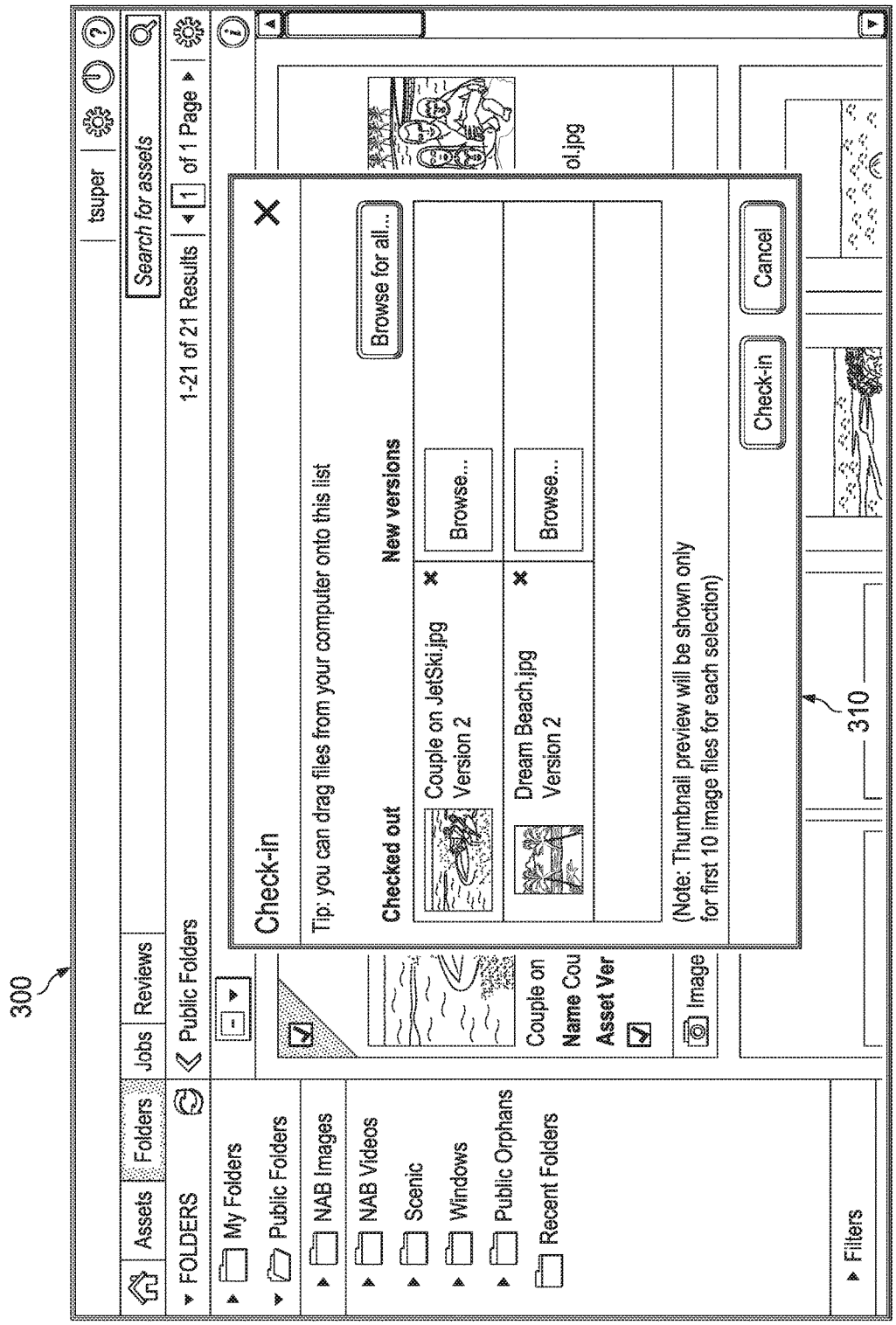
FIG. 3 depicts a screenshot representation of a user interface running on a user device during a check-in procedure.

FIG. 3 depicts a screenshot representation of a user interface 300 running on a user device (e.g., a personal computer, a laptop, or any suitable client device) during a check-in procedure. When a user initiates a check-in procedures, a check-in dialog box 310 starts. FIG. 4 depicts a screenshot representation of a check-in procedure dialog box 400, after a user has clicked or otherwise selected the "browse" button corresponding to asset "Dream Beach.jpg" in the example user interface 300 shown in FIG. 3.

In some embodiments, a user can check in all or a portion of the checked out assets from "Checked Out," "Gallery View," "Search Results," or "Workflows" pages/menu by choosing the option "check in" (or a user interface element thereof). Following is an exemplary description of a check-in procedure initiated from the example "Checked Out" screen or page.

On the navigation bar, the user may click "Checked out" to display the assets that the user checked out. To check in multiple assets, the user selects the assets that the user wishes to check in and then clicks the "Check in" button or the like. In response, the "Check in" screen or page, as exemplified in FIG. 4, will display the selected checked out assets (see, e.g., assets 420 in the example of FIG. 4) and allow the user to browse (via a user interface element or graphical representation 430) for new versions of each asset. Next, the user may perform one of the following actions. In a first example, the user can click the "Browse for all . . . " button to browse for the all the new versions all at once. In another example, the user may click "Browse" to browse for the new version of a specific asset.

By using the "Browse for all . . . " button, the user can choose multiple files at once. The system can validate against the selected file names against the checked out asset file names and ignores the unmatched files. By using the "Browse" button against individual assets, the user can choose a single file to add a new version to it. Alternatively, a user can drag and drop the files on to the list which, in return, will cause the system to match the file names with the checked-out asset names and list them as a new version.

Clicking on the "Check-in" button (see, e.g., FIG. 4) can initiate the check-in process. In some embodiments, the system may ignore the untouched files and add the newer versions for the files that are matched.

Additional details and examples on media management including searching metadata can be found in U.S. Pat. No. 9,348,890, entitled "SYSTEM AND METHOD OF SEARCH INDEXES USING KEY-VALUE ATTRIBUTES TO SEARCHABLE METADATA," which is fully incorporated by reference herein.

These, and other, aspects of the disclosure and various features and advantageous details thereof are explained more fully with reference to the exemplary, and therefore non-limiting, embodiments illustrated and detailed below. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved using distributed, or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for providing multi-file check-in in a content management system, the method comprising:
   receiving, by the content management system from a user device associated with a user through a web server over a network, a request to display files that are checked out by the user and that are locked by the content management system;
   receiving, by the content management system from the user device through the web server over the network, an indication to check in two or more assets, the indication comprising the user dragging and dropping the two or more assets into a folder managed by the content management system; and
   responsive to the indication to check in the two or more assets, initiating, by the content management system, a check-in process to check in the two or more assets in the folder managed by the content management system, the check-in process comprising:
      determining, from the files that are checked out by the user, two or more files with filenames that match filenames of the two or more assets;
      modifying a lock status field associated with each of the two or more files to unlock the two or more files; and
      checking the two or more assets into the content management system as new versions of the two or more files.

2. The method according to claim 1, further comprising: updating a version data field for each of the two or more files.

3. The method according to claim 1, further comprising:
matching each asset of the two or more assets received with files managed by the content management system.

4. The method according to claim 3, wherein matching each asset further comprises comparing files names of the two or more assets received with file names of the files managed by the content management system.

5. The method according to claim 4, wherein matching each asset is performed automatically based on the comparison of the file names.

6. The method according to claim 1, further comprising:
providing a user interface on a client device; and
displaying on the user interface one or more of the files checked out by the user.

7. The method according to claim 6, further comprising:
in response to receiving the request to check in the two or more assets, enabling the user to browse for new versions of the two or more assets.

8. The method according to claim 6, further comprising:
providing a drag and drop interface for enabling the user to select and drag the two or more assets into the folder for multi-file check in.

9. The method according to claim 6, further comprising:
displaying on the user interface a preview of checked out assets and new assets.

10. A system for providing multi-file check-in in a content management system, the system comprising:
a processor; a non-transitory computer readable medium; and stored instructions translatable by the processor for:
receiving, from a user device associated with a user through a web server over a network, a request to display files that that are checked out by the user and that are locked by the content management system;
receiving, from the user device through the web server over the network, an indication to check in two or more assets, the indication comprising the user dragging and dropping the two or more assets into a folder managed by the content management system; and
responsive to the indication to check in the two or more assets, initiating a check-in process to check in the two or more assets in the folder managed by the content management system, the check-in process comprising:
determining, from the files that are checked out by the user, two or more files with filenames that match filenames of the two or more assets;
modifying a lock status field associated with each of the two or more files to unlock the two or more files; and
checking the two or more assets into the content management system as new versions of the two or more files.

11. The system according to claim 10, wherein the stored instructions are further translatable by the processor for:
updating a version data field for each of the two or more files.

12. The system according to claim 10, wherein the stored instructions are further translatable by the processor for:
matching each asset of the two or more assets received with files managed by the content management system.

13. The system according to claim 12, wherein matching each asset further comprises comparing files names of the two or more assets received with file names of the files managed by the content management system.

14. The system according to claim 13, wherein matching each asset is performed automatically based on the comparison of the file names.

15. The system according to claim 10, wherein the stored instructions are further translatable by the processor for:
providing a user interface on a client device; and
displaying on the user interface one or more of the files checked out by the user.

16. The system according to claim 15, wherein the stored instructions are further translatable by the processor for:
displaying on the user interface a preview of checked out assets and new assets.

17. A computer program product comprising a non-transitory computer-readable medium storing instructions translatable by a processor for multi-file check-ins in a content management system, the instructions translatable by the processor for:
receiving, from a user device associated with a user through a web server over a network, a request to display files that are checked out by the user and that are locked by the content management system;
receiving, from the user device through the web server over the network, an indication to check in two or more assets, the indication comprising the user dragging and dropping the two or more assets into a folder managed by the content management system; and
responsive to the indication to check in the two or more assets, initiating a check-in process to check in the two or more assets in the folder managed by the content management system, the check-in process comprising:
determining, from the files that are checked out by the user, two or more files with filenames that match filenames of the two or more assets;
modifying a lock status field associated with each of the two or more files to unlock the two or more files; and
checking the two or more assets into the content management system as new versions of the two or more files.

18. The computer program product according to claim 17, wherein the instructions are further translatable by the processor for:
updating a version data field for each of the two or more files.

19. The computer program product according to claim 17, wherein the instructions are further translatable by the processor for:
matching each asset of the two or more assets received with files managed by the content management system.

20. The computer program product according to claim 19, wherein matching each asset further comprises comparing files names of the two or more assets received with file names of the files managed by the content management system.

* * * * *